United States Patent
Howell et al.

(10) Patent No.: US 8,548,610 B1
(45) Date of Patent: Oct. 1, 2013

(54) UNIVERSAL SYSTEM, METHOD AND COMPUTER PROGRAM PRODUCT FOR DETERMINING A TENNIS PLAYER RATING AND RANKING

(75) Inventors: David Edward Howell, Virginia Beach, VA (US); Alexandre Lopes Cancado, Norfolk, VA (US)

(73) Assignee: Universal Tennis, LLC, Norfolk, VA (US)

( * ) Notice: Subject to any disclaimer, the term of this patent is extended or adjusted under 35 U.S.C. 154(b) by 62 days.

(21) Appl. No.: 12/799,948

(22) Filed: May 5, 2010

Related U.S. Application Data (63) Continuation-in-part of application No. 11/265,009, filed on Nov. 2, 2005, now Pat. No. 7,813,821.

(51) Int. Cl.
*A63F 13/00* (2006.01)

(52) U.S. Cl.
USPC ............... 700/91; 473/415; 463/7; 273/317.4

(58) Field of Classification Search
USPC ............ 700/91; 473/415; 463/7; 273/317.4
See application file for complete search history.

(56) References Cited

U.S. PATENT DOCUMENTS

| | | | | |
|---|---|---|---|---|
| 4,842,275 | A * | 6/1989 | Tsatskin ..................... | 473/468 |
| 6,425,828 | B2 | 7/2002 | Walker et al. | |
| 6,587,740 | B2 | 7/2003 | Byrne et al. | |
| 6,996,444 | B2 * | 2/2006 | Ach, III ..................... | 700/91 |
| 7,050,868 | B1 * | 5/2006 | Graepel et al. ............... | 700/93 |
| 7,097,559 | B2 * | 8/2006 | Okita et al. .................. | 463/11 |
| 7,731,590 | B2 * | 6/2010 | Azuma ....................... | 463/42 |
| 7,813,821 | B1 * | 10/2010 | Howell ....................... | 700/91 |
| 8,317,598 | B2 * | 11/2012 | McNally ..................... | 463/23 |
| 2005/0209717 | A1 * | 9/2005 | Flint et al. ................... | 700/91 |
| 2009/0036215 | A1 * | 2/2009 | Saeki .......................... | 463/42 |

OTHER PUBLICATIONS

"The Glicko System", [dated 1999]. [online]. Retrieved from the intenet <URL:http://www.glicko.net/research/gdescrip.pdf>. 5 pages.*
"How are Ratings Calculated", found at http://web.archive.org/web/200404260847/http://www.wetennis.com/rate.htm.

* cited by examiner

*Primary Examiner* — Lawrence Galka
(74) *Attorney, Agent, or Firm* — Stephen E. Clark (57) ABSTRACT

Systems, methods and computer program products for objectively determining tennis player rankings and rating levels for a broad range of tennis players, from novice amateurs to top-ranked professionals, on a single continuum are disclosed. Player-specific match outcome data stored in an electronic archive database are communicated to an electronic processing element that calculates player rankings and rating levels. Updated player-specific data is then communicated back to the electronic archive database for storage. The disclosed ranking and rating process evaluates each player's body of work, including the results of his/her most recent match. The disclosed ranking and rating process uniquely provides a methodology for objectively factoring in, and applying different ranking-calculating weight to, various match characteristics that influence the reliability of match results, such as match format, the number of times a player has played the same opponent, and the reliability of the accuracy of the opponent's ranking.

6 Claims, 4 Drawing Sheets

UNIVERSAL SYSTEM, METHOD AND COMPUTER PROGRAM PRODUCT FOR DETERMINING A TENNIS PLAYER RATING AND RANKING

CROSS-REFERENCE TO RELATED APPLICATION

This application is a continuation-in-part of U.S. patent application Ser. No. 11/265,009 entitled "System, method and computer program product for determining a tennis player rating", filed Nov. 2, 2005 now U.S. Pat. No. 7,813,821, which is hereby incorporated by reference herein.

BACKGROUND OF THE INVENTION

1. Field of the Invention

The present invention relates generally to computer-based athlete performance rating systems and methods. More particularly, the present invention relates to computer-based systems and methods of rating and ranking tennis players.

2. Description of the Prior Art

Over the past century, tennis players in the United States have been developed primarily through age- and gender-based events (such as tournaments), the results of which are used to determine their rankings. Primary goals of such events have been player development and expansion of the sport.

A great amount of time and resources have been put into the United States Tennis Association's (USTA's) National Tennis Rating Program (NTRP), a program that attempts to rate players according to their respective talent/skill levels, in order to promote competitive match play between players of similar tennis skill.

Under the NTRP and other prior rating schemes of this type, a player typically is initially assigned a rating based on a very subjective assessment of the player's tennis skills. This assessment is typically conducted by a local tennis professional, after having watched the player hit tennis balls for some period of time. Thereafter, whenever the player plays sanctioned matches against other players having the same rating, the results of those matches are recorded. If, after playing a number of matches against like-rated opponents, the player has established a record of badly beating nearly all his/her opponents, then the player will be bumped up to the next higher rating level. If, after playing a number of matches against like-rated opponents, the player has established a record of losing badly to nearly all of his/her opponents, then the player will be bumped down to the next lower rating level. Otherwise, the player's rating will remain the same.

A drawback of such prior rating schemes is that they do not encourage playing outside of one's own rating level, which is a well known path to improving one's game. Such prior rating schemes also are not suited for real-time adjustments in individual players' ratings, but, instead, are better suited for making incremental end-of-season rating adjustments.

While prior rating systems of this type have been in use for many years, they are primarily designed to address the levels of recreational players. Today, they are used largely to rate players in adult tennis leagues. Prior rating systems of this type do not provide a wide range of levels to easily distinguish one level from another across the wide spectrum of competitive play, which, in the NTRP, for example, has caused a glut of players rated from about 2.5-5.0.

Because, in prior rating schemes of this type, criteria for determining individual player ratings are highly subjective, rating levels assigned to similarly talented players vary widely from region to region. Such ratings, therefore, tend to be fairly meaningless outside of the sphere of recreational tennis leagues. And, because they inherently are focused on intra-rating-level play (rather than inter-rating-level play), it is well known that vast numbers of players commonly "game the system" to acquire lower-than-appropriate ratings in order to qualify for regional and national championship tournaments. Such widespread practice of "gaming the system" badly diminishes the effectiveness and accuracy of such prior rating systems.

As distinguished from "rating" schemes, various methods of "ranking" players are also known. As used herein, the term "rating" refers to a grouping level in which all players who are purported to be of a comparable skill level are said to have the same "rating". As used herein, the term "ranking" distinguishes from the term "rating", and refers to the respective hierarchical positions of individual players within one or more groups.

Virtually all prior ranking systems pertain to (i.e., only calculate rankings for) players within specific categories, such as age-based, education-based, geographically-based, or amateur/professional status-based categories. When players move from one category to another category, intra-category rankings invariably cannot be transferred or "carried over" to the new category. Thus, similar kinds of problems arise in the proper identification of a player's true level of skill when comparisons to players in other categories are attempted:

Juniors who move up to the next age category lose ranking points they have earned and have to begin all over again, often at great expense in time and money;

Potential college recruits cannot readily assess how they would compare to players on a given college varsity team;

High School players from one region cannot readily assess how they would compare to high school or college players in another geographic region;

Outside-of-category results (such as inter-sectional match results) do not count towards one's (sectional) ranking, thereby discouraging inter-sectional play;

Even so-called "blue chip" first year college players cannot qualify for national collegiate events based on their junior rankings, because college rankings and ratings are based on college match results, alone, and such players have difficulty quickly accruing enough ranking points to qualify for such events; and, Players from different age groups are evaluated (i.e., ranked and rated) separately and differently, thereby inhibiting meaningful comparison of players who are in different age groups.

Various prior methods for calculating a player's "ranking" are known. Many are largely subjective; others are somewhat less so. Those that rely on subjective criteria for assigning ranking positions are inherently flawed.

Among the more objective prior methods of determining a player's ranking, data such as overall win-loss record, strength of opposition, margin of victory/loss, or head-to-head match results are used to calculate rankings.

A problem with all such prior ranking systems that attempt to objectively rank players is that, aside from a consideration of the opponents' rankings, the same "weight" (i.e., importance in calculating a ranking) is given to each match-result data set, regardless of who the match opponents are. Thus, in prior objective ranking systems, the weight given to the match results for a match against a veteran match player would typically be the same as the weight given to the match results for a match against a newly-rated player—even though match results against newly-rated players (i.e., players whose own rating levels are of questionable accuracy) are inherently less reliable indicators of a player's skill level than are match results against players whose rating level have been repeatedly verified.

Another problem with all such prior ranking systems is that either (1) the same "weight" (i.e., importance in calculating a ranking) is given to each match-result data set regardless of the match format (e.g., two out-of-three sets, three-out-of-five sets, pro set, etc.), or (2) only those matches that are contested using the same match format are considered in calculating rankings. Thus, in all prior ranking systems, either a win in a best-three-out-of-five-sets match is counted the same as winning, say, a single pro set, or the results of one of those matches (typically, the shorter pro set match) would simply be ignored.

Generally speaking, prior systems that are used to calculate rankings are not suitable for calculating ratings; and, prior systems that are used to calculate ratings are generally not suitable for calculating rankings. This is primarily so in the former instance because prior systems that are principally used to determine player rankings (i.e., players' positions relative to each other) do not measure or process those attributes that are indicative of a player's general level of play (i.e., rating). And this is so in the latter instance because prior systems that are principally used to determine a player's general level of play (i.e., rating) are, at best, only able to calculate the relative positions (i.e., ranking) of like-rated players. In such prior rating systems, match-result data sets for matches contested between players who are at different rating levels are typically thrown out (i.e., disregarded). Thus, they are not useful for determining composite rankings of individual players who are at different rating levels.

Another problem associated with prior methods of rating/ranking players across a broad spectrum of playing levels relates to the disparate ways that amateurs and professional rankings are typically calculated. While the NTRP method depends on win-loss records in matches against like-rated players, the Association of Tennis Professionals (ATP), for example, ranks professional tennis players in accordance with how many "ranking points" a player accrues over a given time period (e.g., during the previous twelve month period), and the Intercollegiate Tennis Association (ITA) ranks collegiate players based on their "best wins". It is inherently problematic to transfer player ratings or rankings from one such prior system to another as a player moves from one category to another, such as from amateur high school player to collegiate player to professional player to amateur senior player.

In prior ranking systems like the above-mentioned ATP system, the more ranking points a player accumulates, the higher the player's ranking. The number of "ranking points" awarded to a player depends on to which round (e.g., round of 32, round of 16, quarter-final, semi-final, final, champion) the player wins matches in sanctioned tournaments, with successive rounds being worth more points than earlier rounds, and with more important tournaments (such as Grand Slam tournaments) being worth more points than less important tournaments.

One problem with this prior method of calculating rankings relates to the fact that the rankings are not directly based on "whom" one beats (or loses to), but are, instead, based on "when" (i.e., in what round) and "where" (i.e., in what tournament) the win (or loss) occurs. This prior method of calculating rankings is further skewed because ranking points are accrued—meaning, for example, that between two players of comparable talent, one player (even the less talented of the two) can be more highly ranked than the other simply by virtue of playing in more tournaments. This prior method of ranking tennis players is generally skewed in favor of veteran players and against new players on the circuit. Thus, as will be appreciated by those skilled in the art, this prior system is not suitable for ranking, in a single list, a wide spectrum of players, ranging from amateur players, to new professional players, to seasoned veteran professionals.

Another well known method of ranking players is illustrated by the system used by the Intercollegiate Tennis Association (ITA). In prior ranking systems of this type, a player's ranking is based on his/her (half-dozen, or so) "best" wins. Thus a player that has wins against, say, seven opponents who are all ranked in the top 25 will be ranked higher than a player who only has only three wins against top-25 opponents and whose four next best wins are against opponents ranked, say, between 26 and 50—even if the second player is considerably better than the first player.

Although this type of prior ranking system does, in some instances, award the scheduling of play against highly ranked competition, it inherently penalizes (i.e., attributes a lower ranking to) very good players who, for one reason or another, do not have an opportunity to play against more highly ranked players. Accordingly, this prior ranking system is skewed in favor of players who play lots of matches and do so against highly ranked competition, and is skewed against (i.e., attributes a lower ranking to) new players and other players who have not played lots of matches against highly ranked competition.

Another problem with both the ATP and the ITA ranking schemes is that, in calculating a player's ranking, neither scheme considers the how badly, or how closely, a player beats his/her opponent; but, instead, only considers whether he/she won or lost the match. Thus, with all other things being equal, in such prior ranking systems a player who beats an opponent 6-0, 6-0 would be ranked the same as a player who beat that same opponent 7-5, 6-7, 7-5.

There is, then, a need for an objective universal tennis rating and ranking system that can be used to rate and rank all tennis players on a common scale.

Such a universal rating and ranking systems would advantageously encourage, for example, younger players to develop more quickly by competing regularly against older players.

Such a universal rating and ranking system would also advantageously expand the pool of potential local opponents (beyond one's own gender- and age-groups) for young players, thereby increasing local level-based competitions, reducing missed class-time (that would otherwise be spent travelling to play matches against like-rated players of the same age and gender), and reducing the pressure to resort to online schooling due to the considerable travel needed (under prior ranking systems) to compete nationally.

Such a universal rating and ranking system would also advantageously encourage elite adult players to stay in the game longer than is currently the practice Such a universal rating and ranking system would also advantageously provide more "at risk" juniors (juniors who are not good enough to win a round in regular age-based competitions and are likely to give up) with more friendly entry-level tournament play.

Such a universal rating and ranking system would also advantageously make tennis more affordable, since it would make it easy for many more players—young and old—to find suitable competition locally, without the need for extensive travel.

OBJECTS AND SUMMARY OF THE INVENTION

In light of the foregoing background, the present invention provides systems, methods and computer program products for determining a player rating for at least one tennis player. The systems, methods and computer program products of the present invention enhance the tennis playing experience of tennis players by providing a method by which tennis players can compare themselves to their peers with a consistent comparison methodology that accounts for their relative tennis-playing ability and tennis match competitiveness.

In this regard, it is an object of the present invention to provide systems, methods and computer program products for determining respective tennis player "ratings" for multiple tennis players, wherein the tennis player ratings serve to identify potential tennis player match-ups that would likely, and predictably, result in competitive matches between so-identified tennis players.

It is another object of the present invention to provide systems, methods and computer program products of the character described wherein determination of a tennis player's rating is not based on subjective data, but, instead, is determined based on objective, quantifiable player-specific data.

It is another object of the present invention to provide systems, methods and computer program products of the character described wherein a tennis player's rating can readily be evaluated and confirmed (or revised) immediately after playing each tennis match, thereby facilitating contemporaneous maintenance of a player's rating that accurately reflects the player's current level of performance and competitiveness.

It is another object to provide an embodiment of the present invention in which players of a relatively broadly identified rating group can be readily sub-divided into more narrowly identified rating groups, so as to facilitate even more competitive matching of potential tennis opponents.

It is another object to provide an embodiment of the present invention in which player "rankings" can be determined and readily updated, based on recent match outcomes.

It is another object to provide an embodiment of the present invention in which player rankings can be determined, wherein the weight (i.e., importance in calculating a ranking) given to each match-result data set depends on the reliability of the pre-match rankings of the opposing player.

It is another object to provide an embodiment of the present invention in which meaningful player rankings can be determined using match-result data sets from multiple matches, regardless of whether the match formats (e.g., pro set, 2-out-of-3 sets, 3-out-of-5 sets, etc.) of all of the matches are the same.

It is another object to provide an embodiment of the present invention in which a player's rating level can be determined based, at least in part, upon the player's ranking.

It is another object to provide an embodiment of the present invention in which a player's ranking can be determined based, at least in part, on match results between players of differing rating levels.

It is another object to provide an embodiment of the present invention wherein a player's ranking is influenced (i.e., different ranking weight is given to different match results) depending on the number of times the player has played the same opponent.

It is another object of the present invention to provide a ranking/rating system in which the rankings/ratings of a wide range of players having a broad range of skills, from novice amateurs to seasoned professionals, can all be determined and listed in a single continuum.

It is another object of the present invention to provide a ranking/rating system that is resistant to being "gamed" by players attempting to acquire lower-than-appropriate ratings.

According to one embodiment of the invention, a system for determining at least one tennis player rating and/or ranking for at least one tennis player includes a processing element and an output element. The processing element is capable of receiving tennis player-specific information, wherein the tennis player-specific information is associated with at least one tennis match score; and, based on at least a portion of the tennis player-specific information, the processing element can determine the tennis player rating and/or ranking for the tennis player.

In another embodiment, the system further includes at least one electronic database, which is responsive to the processing element.

And in a further embodiment, the electronic database communicates with the processing element across a wide area network (WAN), such as the Internet. The electronic databases can store the tennis player-specific information based upon the tennis player-specific information received by the processing element.

It is another object to provide an embodiment of the present invention wherein the electronic databases are capable of storing multiple tennis player ratings and/or rankings.

It is another object to provide an embodiment of the present invention wherein the output element, which is also responsive to the processing element, is capable of outputting the tennis player ratings and/or rankings, such as a graphical user interface displaying the tennis player ratings and/or rankings.

Other objects, features and advantages of the present invention will become readily apparent from the following detailed description of the preferred embodiment when considered with the attached drawings and the appended claims.

REFERENCE NUMERALS IN DRAWINGS

10 Preliminary Player Rating Level
11 Input to 12
12 Electronic archive database
14 Match Outcome Data Set
15 Input (from 16) to 18
16 Graphical User Interface (GUI)
18 Processing element
19 Input (from 12) to 18
20 Input (from 18) to 12
21 Opponent's player-specific data
23 Percentage of games won by Player
32 Player Rating Analysis Protocol
33 Calculate % of games won by Player
34 Calculate Match Outcome Factor
35 Match Outcome Factor
36 Calculate Match Result Reliability Factor
37 Calculate Match Result Index Number
38 Match Result Index Number 39 Opponent's Player Rating Number
40 Match Result Reliability Factor
41 Opponent's Player Rating Reliability Coefficient
42 Match Format Reliability Coefficient
43 Match Frequency Reliability Coefficient
49 Calculate Player Rating Number
50 Player Rating Number
60 Player Rating Level Analysis protocol
70 Player Rating Level
70a new (lower) Player Rating Level
70b new (higher) Player Rating Level
70c new (unchanged) Player Rating Level

DETAILED DESCRIPTION OF THE PREFERRED EMBODIMENT

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be described more fully herein below, the present invention provides systems, methods and computer program products for determining a player rating for at least one tennis player. The present invention also provides systems, methods and computer program products for determining a player ranking for at least one tennis player with respect to multiple other tennis players.

As mentioned above, the term "rating" as used herein refers to a grouping level in which all players who are purported to be of a comparable skill level are said to have the same "rating"; and, as used herein, the term "ranking" distinguishes from the term "rating", and refers to the respective hierarchical positions of individual players within one or more groups.

For the purpose of explanation, the preferred embodiment of the invention is herein described wherein a player rating scale that ranges from "Level 1" to "Level 16", in increments of one, is employed. Generally, the lower the rating the lower the skill and competitive level of the player; and, conversely, the higher the rating the higher the skill and competitive level of the player. As will become evident from reading the following description, alternative rating scales, having different ranges and different increments, can similarly be used without departing from the spirit of the present invention.

In the preferred embodiment of the invention, a rating scale is initially established wherein respective rating numbers generally correspond to the following tennis player skill levels:

Level 1: There are 3 criteria to be Level 1. First, the player must be able to serve from the baseline; second, the player must be able to return a serve that is hit from the baseline; and third, the player must be able to play the ball on one bounce. Players at this level are able to bump the ball over the net and keep a short rally going. They often have trouble with short balls, and often they stand just inside the baseline and get hurt by balls, which are in their fee (blind spot).

Level 2: Players at this level do a better job of anticipating the short shot compared to lower level players. They are also able to recover behind the baseline more frequently. A typical Level 2 player can sustain long rallies, especially off the forehand side. Backhands are typically less well developed, but they seem able to defend well enough off the backhand side. Serving is reliable, but not powerful.

Level 3: There are many different tennis skills that describe Level 3 players. Some players have few skills, but make up for it with their athleticism. Others are starting to develop defined strokes.

Level 4: It is not unusual to see Level 4 players with very advanced, well-rounded skills. Often these players show signs of being able to volley and hit overheads, though with little power or decisiveness. Older Level 4 players are often able to compete despite not having acquired a good balance of well-defined tennis skills.

Level 5: The adults at this level may be vulnerable in many areas, but will usually be able to perform one tennis skill fairly well. This may include a good slice backhand, decent serve, or a drop shot. Young juniors at this level are very good for their age, but still may have trouble with adults whose games are not at good as theirs. Many older level 5 juniors will improve and become more consistent if they simply play more tennis. Often players at this level have problems with technical development in certain areas. They may have good ground strokes, but an undeveloped serve. If they do have a good overall game, consistency and shot selection can be problematic.

Level 6: At this level, court coverage and anticipation are well developed. These players are familiar with a wide variety of strokes and spins. At this stage players may be able to set points up using their serve. Level 6 players may often make tactical mistakes and "throw away" too many points. When they do rely on consistency, they may often underplay. While these players may have a lot of variety in their games, they often do not possess the confidence to use their shots in close matches. Consistency usually wins at this level.

Level 7: Players at this level usually have some outstanding characteristic in their game. They also typically have some part of their game that does not hold up well under pressure. For example, a Level 7 player may have good overhead technique, but often has problems executing in match play situations. They often do well in practice, but fail to perform in competition.

Level 8: Players at this level are very accomplished with fully developed games. They may range in age from 14 to 60 with the players at either extreme being very good for their age. A Level 8 player under the age of 15 will be a very solid talent. This will be the kind of player who has potential to play Division 1 NCAA tennis or beyond. Adult Level 8's may have reached their peak, which they may maintain for a very long time. For an Adult Level 8 to move beyond this level often takes a tremendous commitment to fitness, practice and play. Junior girls who have reached this level will normally have a national ranking and be preparing for Division 1 NCAA tennis. Players at this level may have technical problems in their games, but they have usually learned how to cope with these problems and compensate successfully in some way.

Levels 9 and 10: These two levels may often be combined because by this stage there are generally fewer players who have reached this level than the levels below. Players at these two levels all have very advanced games, have strong weapons, and can cover up their weaknesses. These players are usually among the best players in an area. Junior players at these levels are highly likely to play Division 1 NCAA tennis. Junior girls will be among the top players nationally. Adults at this level may maintain this standard into their fifties if they are sufficiently motivated. These are very talented individuals. Females at this level will be very accomplished. These players are often motivated by the "love of the game".

Levels 11 and 12: Prize money events may motivate players at these levels. Juniors who reach this level will be highly ranked sectional players and also have significant national rankings. Most of the players who make up this category are former or current U.S. collegiate Division 1 NCAA players in their twenties to early thirties. Only the most motivated and talent players in their thirties will maintain this level. Females at this level will be extraordinary and often will have professional experience. Local players who can exceed this level typically are either current collegiate NCAA Division 1 players or are players who are contemplating playing professional tennis as a career.

Levels 13, 14, 15 and 16: This is the upper level U.S. collegiate Division 1 male player, professional male and female players.

In the preferred embodiment of the present invention, the above player level descriptions are used principally as a starting point by which to assign player rating levels to selected benchmark players in the system's electronic archive database. In accordance with the present invention, tennis players' ratings thereafter are determined, validated, and, when indicated, adjusted by a processing element based on actual tennis match outcomes between players whose player-specific information is stored in the database.

Figure 1:
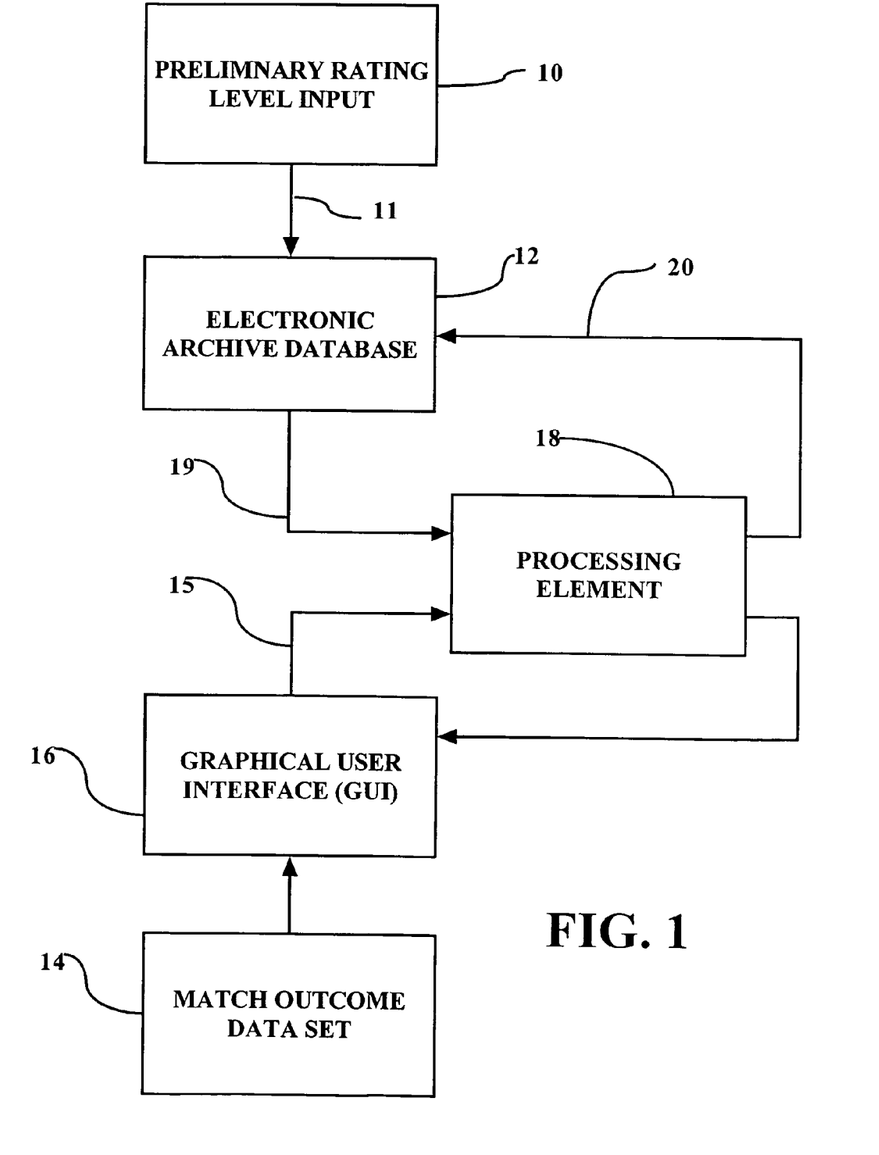
FIG. 1 is a block diagram of a system for determining a tennis player rating or ranking for at a tennis player, according to one embodiment of the present invention.

Referring to FIG. 1, the method by which a player rating is determined in accordance with the preferred embodiment of the present invention is described. A Preliminary Rating Level 10 is preferably assigned to selected benchmark players and is input 11 to an electronic archive database 12. The electronic archive database 12 stores player-specific information for each of a plurality of tennis players that are being tracked by the rating and ranking system (occasionally referred to herein as "the System"). The "player-specific" information preferably includes at least the player's identification and his/her current player rating data. As will be described more fully herein below, additional player-specific information stored in the electronic archive database 12 preferably includes Match Outcome Data Sets 14 (comprising opponents' identifications, match formats and scores from respective previous matches) for each match played by players in the System. Each person for whom there is such player-specific information stored in the database is referred to herein as a "rated player".

Whenever a tennis match is played between two rated players, a Match Outcome Data Set 14 relating to the results of the match is preferably input 15 to a processing element 18 via a graphical user interface ("GUI") 16 (or other input/output element or elements). The Match Outcome Data Set 14 for each match preferably includes at least the names (or identification numbers) of the players in the match, the date of the match, the score of the match and the match format (e.g., 2-out-of-3 sets, 8-game pro set, etc.).

The processing element 18 is capable of receiving tennis player information. The processing element 18 can comprise any of a number of different devices, such as a personal computer or other high level processor. The electronic archive database 12 is capable of storing the tennis player information, including Match Outcome Data Sets 14. The processing element 18 and the electronic archive database 12 are in communication with each other. In this regard, the processing element 18 and electronic archive database 12 can communicate in a number of different manners but, in a preferred embodiment, communicate via a wide area network (WAN), such as the Internet. As a result, in one typical configuration, the processing element 18 and GUI 16 reside at a location proximate a tennis player who inputs Match Outcome Data Set 14 into the processing element 18 following the player's match. In an alternate configuration, the processing element 18 is accessible only to the system administrator(s), who control(s) information flow between the processing element 18 and the GUI 16 and/or between the processing element 18 and the electronic archive database 12.

Referring still to FIG. 1: The processing element 18 analyzes the Match Outcome Data Set 14 for each match between two rated players by comparing, for each of the two players, the Match Outcome Data Set 14 that is input 15 (via the GUI 16) to the processing element 18 and the respective player-specific data that are input 19 to the processing element 18 from the electronic archive database 12. After analyzing the Match Outcome Data Set 14 and the player-specific information from the electronic archive database 12, the player-specific information that is stored in the electronic archive database 12 for each of the two players is updated, based on input 20 from the processing element 18.

Whenever a tennis match is played between rated players, the Match Outcome Data Set 14 is input 15 to the processing element 18 via the GUI 16. In the preferred embodiment of the invention, player-specific information, including the date of the match, the score of the match, the format of the match, and the identifications of the players in the match, is passed 20 from the processing element 18 to the electronic archive database 12, where Match Outcome Data Sets 14 are compiled and stored for each rated player.

Figure 2:
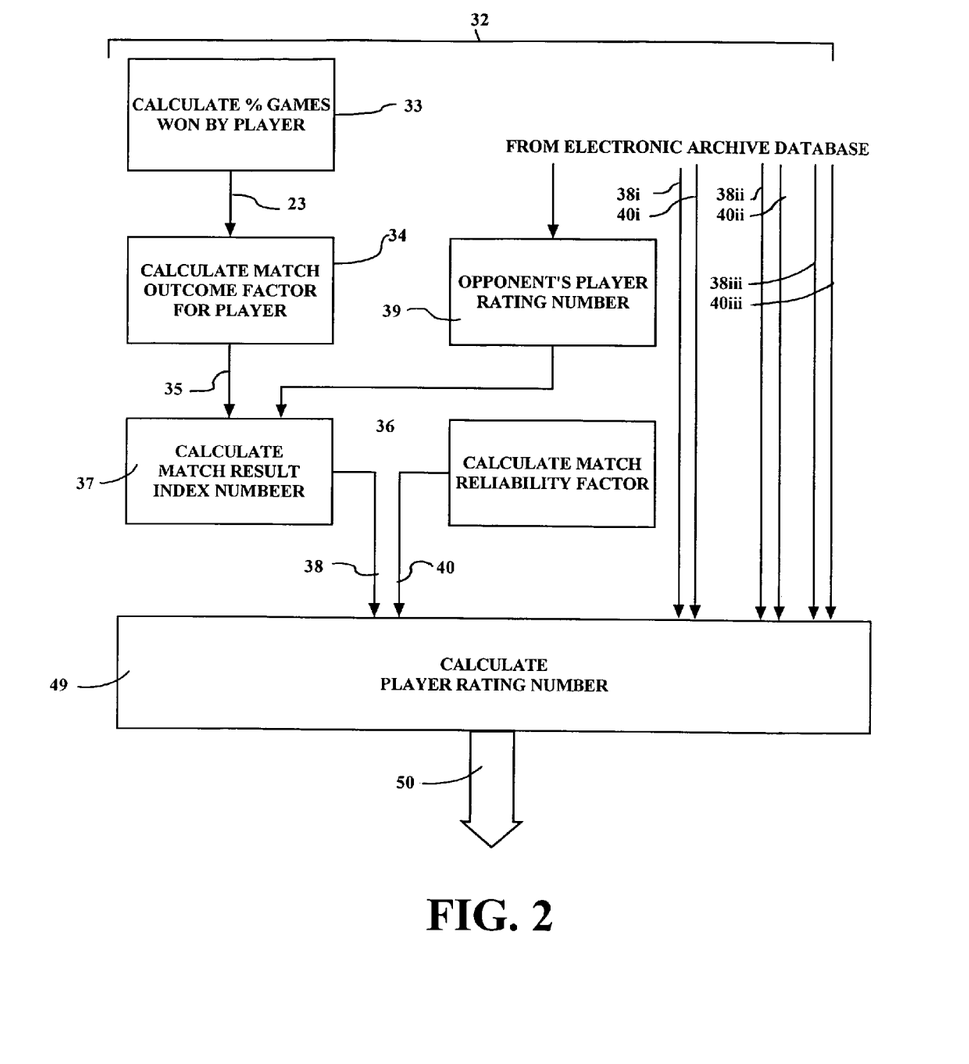
FIG. 2 is a flow chart illustrating the steps of a method of determining a tennis player rating number in accordance with the present invention.
Figure 3:
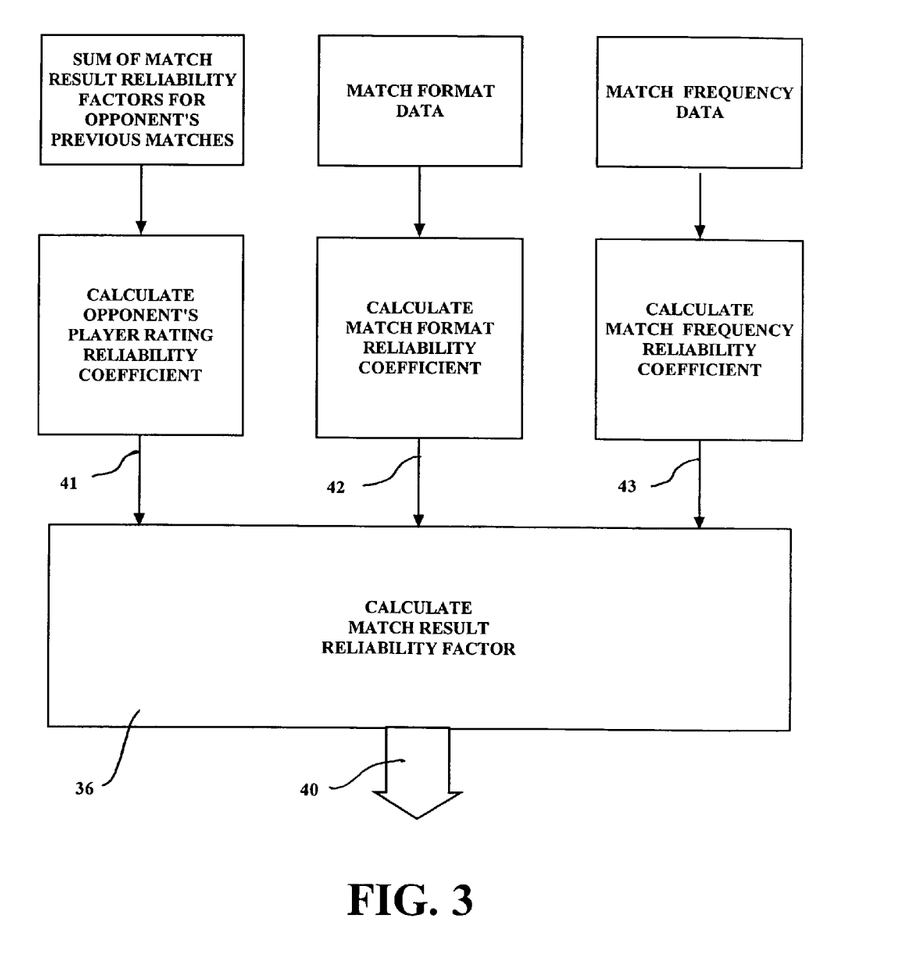
FIG. 3 is a flow chart illustrating the steps of a method of determining a match result reliability factor in accordance with the present invention; and, FIG. 4 is a flow chart illustrating the steps of a method of determining a new player rating level in accordance with the present invention.

Referring now to FIGS. 2 and 3: A Player Rating Level 70 and a Player Rating Number 50 are determined for each player in the System. The Player Rating Level 70 for a given player corresponds to (but is rarely numerically equivalent to) that player's Player Rating Number 50. The player's Player Rating Number 50 is recalculated (and usually changes) after every match. The player's Player Rating Level 70, however, does not normally change after each match. The preferred protocol for calculating a player's new Player Rating Number 50 following a match is as follows.

Referring to FIGS. 1 and 2: Following a match between two rated players, Match Outcome Data Set 14 pertaining to that match is input 15 to the processing element 18, as shown in FIG. 1. The Match Outcome Data Set 14 includes, among other data, the identifications of the two players, the match score, the match format and the date of the match. Additional player-specific information, including, for example, the respective Player Rating Number 50 and other data for each of the two players, is input 19 from the Electronic Archive Database 12 to the Processing Element 18.

The Processing Element 18 conducts a player rating analysis 32 for each of the two players (herein referred to as the "Player" and the "Opponent") as schematically illustrated in FIG. 2. The preferred protocol 32 by which the processing element conducts a player rating analysis for the Player (and, similarly, for the Opponent) is described as follows.

As discussed above, Match Outcome Data Set 14 for a particular tennis match between two previously equally rated players (the "Player" and the "Opponent") is input 15 to a processing element 18 via GUI 16.

The processing element first calculates 33 the percentage of games won by the Player during the match. The percentage of games won by the Player is simply the total number of games won by the player divided by the total number of games played in the match.

The percentage of games won 23 by the Player during the match is then used by processing element 14 in calculating 34 a Match Outcome Factor 35 pertaining to that match for the Player. The Match Outcome Factor 35 is a variable number (whose value is between −A and +A, where A is a constant) that generally corresponds to the theoretical amount that the Player's new Player Rating Number 50 would be above or below his/her Opponent's Player Rating Number, if the results of this match were the only match results that were available for rating the two players.

Generally speaking, the lower the percentage of games won by the Player, the lower the Match Outcome Factor 35 will be; and, conversely, the higher the percentage of games won by the Player, the higher the Match Outcome Factor 35 will be.

In the preferred embodiment of the invention, for a given match, the Match Outcome Factor 35 has a numerical value equivalent to:

$$-A+[(\text{percentage of games won by Player}) \times (2A)],$$

where "A" is a constant, whose numerical value is preferably between 1 and 5, depending on the range of rating levels in the system, which is predetermined by the System's operator.

The Match Outcome Factor 35 is then used by the processing element 14 to calculate 37 a Match Result Index Number 38 for that particular match. The Match Result Index Number 38 is a number that roughly corresponds to the player rating number that the Player would theoretically have if other important factors, such as results from previous matches and mitigating characteristics pertaining to the conditions of this and previous matches, were not also considered.

In the preferred embodiment of the invention, the Match Result Index Number 38 for a particular match is calculated 37 by adding the Match Outcome Factor 35 for the Player to the Opponent's Player Rating Number 39.
This can be mathematically expressed as:

Match Result Index Number=Player's Match Outcome Factor+Opponent's Player Rating Number The Opponent's Player Rating Number 39 is included among the Opponent's player-specific data that are stored in the electronic archive database 12, and is passed from the electronic archive database 12 to the processing element 18 (FIG. 1).

The processing element 18 uses the Match Result Index Number 38 of the latest match played by the Player, in combination with Match Result Index Numbers (38i, 38ii, 38iii, etc.) of a number of previous matches played by the Player, to calculate a new Player Rating Number 50 for the Player. In calculating the Player's new Player Rating Number 50, the various Match Result Index Numbers (38i, 38ii, 38iii, etc.) from previous matches played by the Player are each weighted differently, depending on the relative reliability of each of those values. Accordingly, before calculating the Player's new Player Rating Number 50, it is first necessary to designate a Match Result Reliability Factor 40 (40i, 40ii, 40iii, etc.) for each match played by the Player.

Referring now to FIG. 3: The Match Result Reliability Factor 40 for a given match is calculated 36 by the electronic processing element and preferably depends on (1) the reliability of the rating of the Opponent, (2) the format of the match, and (3) the number of considered matches that were played between the Player and that particular Opponent. In the preferred embodiment of the invention, these three variables are quantitatively represented by an Opponent's Player Reliability Coefficient 41, a Match Format Reliability Coefficient 42 and a Match Frequency Reliability Coefficient 43, respectively.

The Opponent's Player Reliability Coefficient 41 for a given opponent preferably has a numerical value between 1 and 10, wherein higher values correspond to rated players whose rating numbers are considered highly reliable, and wherein lower values correspond to rated players whose rating numbers 50 are considered less reliable. All benchmark players have a Player Reliability Coefficient of 10. The method of calculating a player's Player Reliability Coefficient 41 will be discussed in detail further below.

The Match Format Reliability Coefficient 42 for a particular match is a number, preferably between 0.1 and 1.0, wherein higher values correspond to match formats that typically produce more meaningful results (such as 3-out-of-5 set match format), and wherein lower values correspond to match formats that typically produce less meaningful results (such as shortened "pro set" format). In the preferred embodiment of the invention, 3-out-of-5 set and 2-out-of-3 set format matches have a Match Format Reliability Coefficient 42 of 1.0; and pro sets have a Match Format Reliability Coefficient 42 of 0.7.

The Match Frequency Reliability Coefficient 43 for a particular match is a number that is inversely proportional to the number of considered matches that have been played by the particular Player against the same Opponent. In the preferred embodiment of the invention, the Match Frequency Reliability Coefficient 43 (for a match between a Player and a particular Opponent) has a numerical value equivalent to 1 divided by the number of considered matches played between the Player and the Opponent.

In the processing element 18, The Opponent's Reliability Coefficient 41, the Match Format Reliability Coefficient 42 and the Match Frequency Reliability Coefficient 43 are multiplied together to yield the Match Result Reliability Factor 40 for a given match.

Referring again to FIG. 2: The processing element 18 next determines a new Player Rating Number 50 for the Player. The new Player Rating Number 50 takes into account not only the results (i.e., Match Result Index Number 38 and Match Result Reliability Factor 40) from the player's latest match, but also considers the results (i.e., Match Result Index Numbers 38i, 38ii, 38iii and Match Result Reliability Factors 40i, 40ii, 40iii, respectively) of several (preferably up to 100) other matches played by that Player over a predetermined period of time (preferably up to 12 months), weighting each in accordance with its respective reliability factors 40, 41, 42. Mathematically, the new Player Rating Number 50 is represented by the following formula:

$$\text{Player Rating Number} = \frac{\sum[(\text{Match Result Index Number}) \times (\text{Match Result Reliability Factor})]}{\sum(\text{Match Result Reliability Factor})}$$

Figure 4:
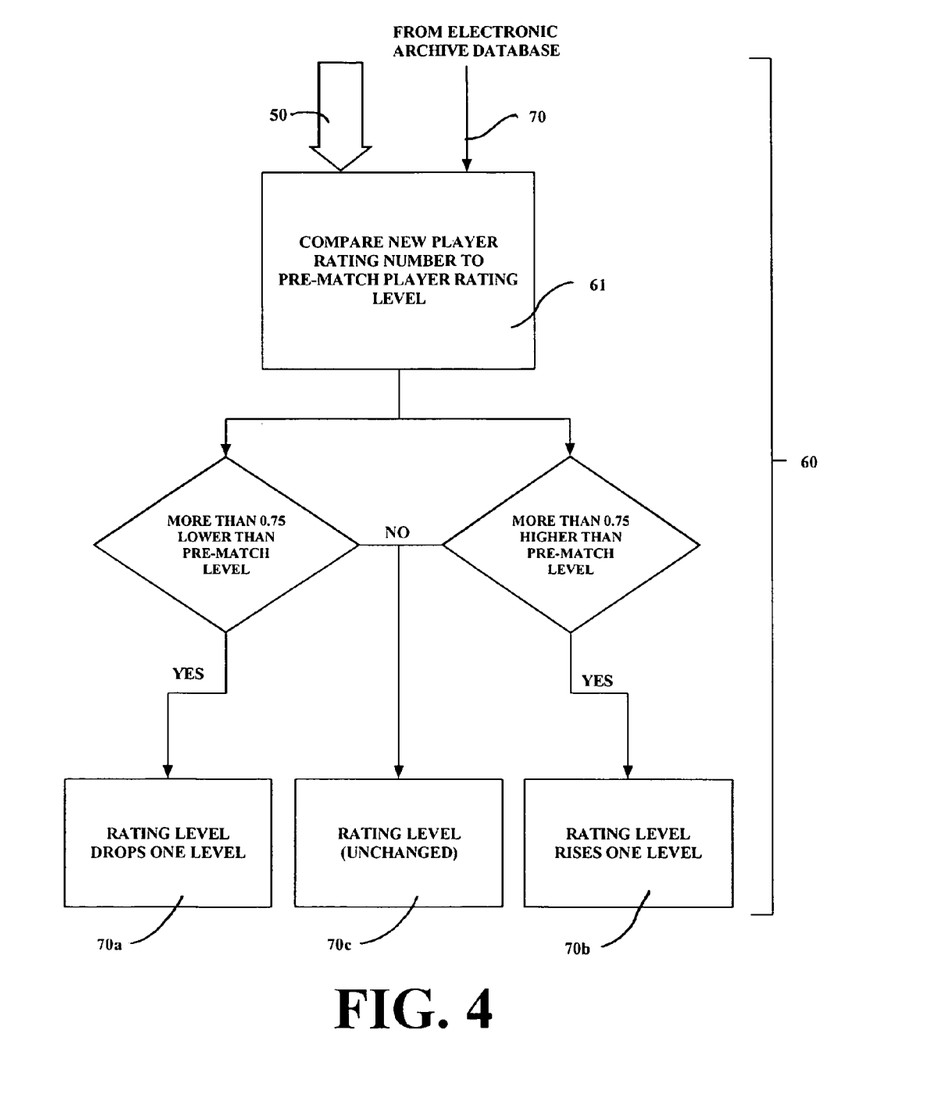

Referring now to FIG. 4: Once a new Player Rating Number 50 for a player has been calculated, the processing element conducts an analysis 60 to determine whether the player's Player Rating Level 70 is to be raised, lowered or remain the same. The preferred protocol 60 by which the processing element determines a Player Rating Level is shown in FIG. 4. The processing element compares 61 the player's pre-match Player Rating Level 70 to the player's new Player Rating Number 50. If the numerical value of the Player's new Player Rating Number 50 is more than 0.75 lower than his/her pre-match Player Rating Level 70, then his/her Player Rating Level drops one level to a new (lower) Player Rating Level 70a; if the numerical value of the Player's new Player Rating Number 50 is more than 0.75 above his/her pre-match Player's Rating Level 70, then his/her Player's Rating Level rises one level to a new (higher) Player Rating Level 70b; otherwise, his/her Player's Rating Level remains unchanged (70c).

Following each match, the match score, the match date, the match format, the new Player Rating Level 70, 70a, or 70b, the new Player Rating Number 50 and the Match Result Reliability Factor 40, (which, together, comprise a single Match Outcome Data Set), are communicated 20 from the processing element 18 to the electronic archive database 12.

It will be understood from the foregoing description that a Player Rating Number 50 is calculated for each rated player (i.e., for every player that is in the System), and that such individual Player Rating Numbers can be recalculated and updated in the electronic archive database 12 after each match. It will also be understood that higher Player Rating Numbers represent higher levels of competitive skill and success; and, conversely, lower Player Rating Numbers represent lower levels of competitive skill and success. Accordingly, it will be understood that any player's ranking (i.e., hierarchical position with respect to all others players in the System, regardless of their rating level) can be readily determined by comparing the player's Player Rating Number to that of any other player in the System.

Sample Calculation of Player Rating Number

To facilitate an understanding of the present invention, the manner of calculating a ranking and rating for a hypothetical "Player A" is described below. For purposes of this example, let us assume that Player A has played a total of ten matches against nine different players, namely Opponent I, Opponent II, Opponent III (twice), Opponent V, Opponent VI, Opponent VII, Opponent VIII, Opponent IX and Opponent X. Let us also assume, for this example, that Opponents I through X are each rated players whose ranking numbers have been previously calculated in accordance with the present invention and are, along with other pertinent player-specific information, stored in the electronic archive database 12.

In order to determine the ranking of Player A in accordance with the preferred embodiment of the present invention, several factors pertaining to each match played between Player A and Opponents I-X, respectively, are taken into account. Among these factors are the percentage of games won by Player A in each of those matches and the respective opponents' Player Rating Numbers 39.

By way of example, consider match data shown in Table 1 for a series of hypothetical tennis matches played between Player A and Opponents I-X, with the most recent match being the match that was played against Opponent X:

TABLE 1

Sample Match Results between Player A and various opponents

| Opponent | Opponent's Rating Number (39) | Match Score | Percentage of Games Won by Player A (23) |
|---|---|---|---|
| Opponent I | 12 | L 6-3; 6-2 | 29% |
| Opponent II | 12 | W 7-6, 6-7, 7-6 | 51% |
| Opponent III | 11 | W 6-4, 6-2 | 66% |
| Opponent III | 11 | W 6-1, 6-0 | 92% |
| Opponent V | 10 | W 6-3, 6-3 | 66% |

TABLE 1-continued

Sample Match Results between Player A and various opponents

| Opponent | Opponent's Rating Number (39) | Match Score | Percentage of Games Won by Player A (23) |
|---|---|---|---|
| Opponent VI | 12 | L 7-5, 6-0 | 27% |
| Opponent VII | 12 | L 6-4, 6-4 | 40% |
| Opponent VIII | 11 | W 6-2, 3-6, 6-2 | 60% |
| Opponent IX | 12 | L 8-4 | 33% |
| Opponent X | 10 | W 6-2, 6-4 | 66% |

A Match Result Index Number 38 is to be calculated for each match played by Player A. The Match Result Index Number 38 is calculated for each match by adding a Match Outcome Factor 35 to Player A's respective opponent's rating number 39, for each match played by Player A.

In the preferred embodiment of the invention, Match Outcome Factors 35 have numerical values that range between −A and +A. For any given match, a Match Outcome Factor 35 is calculated based on the percentage of games won in the match by Player A, and preferably varies linearly between −A and +A.

Match Outcome Factors 35 for each of Player A's previously played matches are calculated and shown (in the far right column) in Table 2:

TABLE 2

Sample Match Results between Player A and various opponents

| Opponent | Opponent's Rating Number (39) | Match Score | % of Games Won by Player A (23) | Match Outcome Factor (35) |
|---|---|---|---|---|
| Opponent I | 12 | L 6-3; 6-2 | 29% | −.42A |
| Opponent II | 12 | W 7-6, 6-7, 7-6 | 51% | +.02A |
| Opponent III | 11 | W 6-4, 6-2 | 66% | +.32A |
| Opponent III | 11 | W 6-1, 6-0 | 92% | +.84A |
| Opponent V | 10 | W 6-3, 6-3 | 66% | +.32A |
| Opponent VI | 12 | L 7-5, 6-0 | 27% | −.46A |
| Opponent VII | 12 | L 6-4, 6-4 | 40% | −.20A |
| Opponent VIII | 11 | W 8-4 | 66% | +.32A |
| Opponent IX | 12 | L 8-4 | 33% | −.34A |
| Opponent X | 10 | W 6-2, 6-4 | 66% | +.32A |

After calculating Player A's Match Outcome Factor 35 for each match, the next step is to calculate Player A's Match Result Index Number 38 for each match. Player A's Match Result Index Number 38 for a given match is determined by adding Player A's Match Outcome Factor 35 to Player A's respective opponent's player rating number 39.

Player A's Match Result Index Number 38 for each of the matches in the preceding example is calculated and shown (in the far right column) in Table 3:

TABLE 3

Sample Match Results between Player A and various opponents

| Opponent | Opponent's Rating Number (39) | Match Score | % of Games Won by Player A (23) | Match Outcome Factor. (35) | Match Result Index Number (38) |
|---|---|---|---|---|---|
| Opponent I | 12 | L 6-3; 6-2 | 29% | −.42A | 12 − .42A |
| Opponent II | 12 | W 7-6, 6-7, 7-6 | 51% | +.02A | 12 + .02A |

TABLE 3-continued

Sample Match Results between Player A and various opponents

| Opponent | Opponent's Rating Number (39) | Match Score | % of Games Won by Player A (23) | Match Outcome Factor. (35) | Match Result Index Number (38) |
|---|---|---|---|---|---|
| Opponent III | 11 | W 6-4, 6-2 | 66% | +.32A | 11 + .32A |
| Opponent III | 11 | W 6-1, 6-0 | 92% | +.84A | 11 + .84A |
| Opponent V | 10 | W 6-3, 6-3 | 66% | +.32A | 10 + .32A |
| Opponent VI | 12 | L 7-5, 6-0 | 27% | −.46A | 12 − .46A |
| Opponent VII | 12 | L 6-4, 6-4 | 40% | −.20A | 12 − .20A |
| Opponent VIII | 11 | W 6-2, 3-6, 6-2 | 60% | +.32A | 11 + .32A |
| Opponent IX | 12 | L 8-4 | 33% | −.34A | 12 − .34A |
| Opponent X | 10 | W 6-2, 6-4 | 66% | +.32A | 10 + .32A |

The value of A, above, is a fixed number for each rating system, and depends on the range of player rating level graduations in the system. The numerical value of A for a given rating system is preselected by the system operator. For purposes of the present example, let us assume that the value of A is 3.0.

Thus, Player A's Match Result Index Number 38 for each of the matches in the preceding example can be calculated as shown (in the far right column) in Table 4:

TABLE 4

Sample Match Results between Player A and various opponents

| Opponent | Opponent's Rating Number (39) | Match Score | Match Result Index Number (38) |
|---|---|---|---|
| Opponent I | 12 | L 6-3; 6-2 | 12 − .42(3) = 10.74 |
| Opponent II | 12 | W 7-6, 6-7, 7-6 | 12 + .02(3) = 12.06 |
| Opponent III | 11 | W 6-4, 6-2 | 11 + .32(3) = 11.96 |
| Opponent III | 11 | W 6-1, 6-0 | 11 + .84(3) = 13.52 |
| Opponent V | 10 | W 6-3, 6-3 | 10 + .32(3) = 10.96 |
| Opponent VI | 12 | L 7-5, 6-0 | 12 − .46(3) = 10.62 |
| Opponent VII | 12 | L 6-4, 6-4 | 12 − .20(3) = 11.40 |
| Opponent VIII | 11 | W 6-2, 3-6, 6-2 | 11 + .32(3) = 11.96 |
| Opponent IX | 12 | L 8-4 | 12 − .34(3) = 10.98 |
| Opponent X | 10 | W 6-2, 6-4 | 10 + .32(3) = 10.96 |

It can be reasonably expected that match results for matches contested between players with long, documented track records are likely to be more meaningful and more reliable than the results for matches contested between newcomer or unvetted opponents. For example, it can be reasonably expected that the precise ranking of a player for whom there are verifiable match result records for several dozens of matches is likely to be very reliable. On the other hand, it can reasonably be expected that it would be difficult to precisely rank a player for whom there is, say, only one known match result.

Accordingly, in the preferred embodiment of the invention, each Player is assigned a "Player Rating Reliability Coefficient" 41, which generally relates to the number of quality matches that a given player has on record in the System. The manner of calculating a Player Rating Reliability Coefficient 41 for a player will be explained in detail below, but, as discussed above, is a number between 0 and 10, wherein higher numbers indicate that higher quantity and/or more reliable data for the player are on record in the System and wherein lower numbers indicate that lower quantity and/or less reliable data for the player are on record in the System.

It will be appreciated by those skilled in the art that all match results are not equally accurate indicators of a player's skill level. For example, it can be understood that the result of a three- or five-set match are likely to be better indicators of how good a player is than the result of a shortened 8-game "pro set".

Accordingly, in the preferred embodiment of the invention, each match is assigned a Match Format Reliability Coefficient 42, the numerical value of which depends on the format of the match. In the preferred embodiment of the invention, Match Format Reliability Coefficients 42 preferably have the following values:

Best 2-out-of-3 sets format—Reliability Coefficient: 1.0;
Best 3-out-of-5 sets format—Reliability Coefficient: 1.0;
8-game "pro set" format—Reliability Coefficient: 0.7; and,
"Mini set" match format—Reliability Coefficient: 0.7.

It will also be appreciated by those skilled in the art that if a player were to play one match each against dozens of different opponents, the results of all those matches, taken as a whole, would be a better indicator of how good that player is than if the player were only ever to play matches against one particular opponent. In the latter instance, although there may be numerous match result data sets on record for how the player fares against that one opponent, there may well be some doubt about how that player would fare against other (i.e., different) opponents having different strengths and weaknesses.

Accordingly, in the preferred embodiment of the invention, each match is assigned a Match Frequency Reliability Coefficient 43 value, which is inversely proportional to the number of times the player has played a particular opponent.

The Player Rating Reliability Coefficient 41, the Match Format Reliability Coefficient 42, and the Match Frequency Reliability Coefficient 43 for each match are preferably multiplied together to yield a "Match Result Reliability Factor" 40 for each match.

For purposes of examining the example shown in the preceding example (and summarized in Tables 1-4), let us assume that all of those matches were 2-out-of-three sets format except for the match against Opponent IX, which was an 8-game pro set. Thus, the Match Format Reliability Coefficient 42 for all of those matches is 1.0, except for the match between Player A and Opponent IX, for which the Match Format Reliability Coefficient 42 is 0.7.

And, for purposes of examining the example discussed above (and summarized in Tables 1-4), let us assume that there are several dozens of reliable match result data sets on record for all of Player A's opponents, except for Opponent X, for whom there are very few match result data sets in the system. Thus, for purpose of the present example, let us assume that the Player Rating Reliability Coefficient 41 for all of Player A's listed opponents is 10, except for Opponent X, for whom the Player Rating Reliability Coefficient 41 is 3.

And, for purposes of examining the example discussed above (and summarized in Tables 1-4), let us assume that Player A has played each of the listed opponents only one time, except for Opponent III, whom Player A has played twice. Thus, Player A's Match Frequency Reliability Coefficient 43 for each of the matches in the above example is 1/1=1, except for the matches against Opponent III, for each of which the Match Frequency Reliability Coefficient 43 value is 1/2.

As mentioned above, the Player Rating Reliability Coefficient 41 and the Match Format Reliability Coefficient 42 and the Match Frequency Reliability Coefficient 43 for each match are all multiplied together to yield a Match Result Reliability Factor 40 for each match. Thus, the Match Result Reliability Factor 40 for each of the matches in the preceding table can be calculated as shown (in the far right column) in Table 5:

TABLE 5

Sample Match Results between Player A and various opponents

| Opponent | Match Score | Match Result Index Number (38) | Match Result Reliability Factor (40) |
|---|---|---|---|
| Opponent I | L 6-3; 6-2 | 10.74 | $1.0 \times 1 \times 10 = 10$ |
| Opponent II | W 7-6, 6-7, 7-6 | 12.06 | $1.0 \times 1 \times 10 = 10$ |
| Opponent III | W 6-4, 6-2 | 11.96 | $1.0 \times (1/2) \times 10 = 5$ |
| Opponent III | W 6-1, 6-0 | 13.52 | $1.0 \times (1/2) \times 10 = 5$ |
| Opponent V | W 6-3, 6-3 | 10.96 | $1.0 \times 1 \times 10 = 10$ |
| Opponent VI | L 7-5, 6-0 | 10.62 | $1.0 \times 1 \times 10 = 10$ |
| Opponent VII | L 6-4, 6-4 | 11.40 | $1.0 \times 1 \times 10 = 10$ |
| Opponent VIII | W 6-2, 3-6, 6-2 | 11.96 | $1.0 \times 1 \times 10 = 10$ |
| Opponent IX | L 8-4 | 11.10 | $0.7 \times 1 \times 10 = 7$ |
| Opponent X | W 6-2, 6-4 | 10.96 | $1.0 \times 1 \times 3 = 3$ |

In order to calculate Player A's new player rating number 50, a weighted average of Match Result Index Numbers 38 and Match Result Reliability Factors 40, for all ten of his matches, is calculated according to the following formula:

$$\text{Player Rating Number} = \frac{\sum [(\text{Match Result Index Number}) \times (\text{Match Result Reliability Factor})]}{\sum (\text{Match Result Reliability Factor})}$$

Thus, for the example discussed above (and summarized in Tables 1-5), Player A's rating number 50 can be calculated as follows:

$[(10.74 \times 10) + (12.06 \times 10) + (11.96 \times 5) + (13.52 \times 5) + (10.96 \times 10) +$ $(10.62 \times 10) + (11.40 \times 10) + (11.96 \times 10) + (11.10 \times 7) +$ $(10.96 \times 3) \div (10 + 10 + 5 + 5 + 10 + 10 + 10 + 10 + 7 + 3) =$ $[107.4 + 120.6 + 59.8 + 67.6 + 109.6 + 106.2 + 114.0 +$ $119.6 + 77.7 + 32.8] \div [80] = [915.3] \div [80] =$ $11.44 = \text{Player } A\text{'s new Player Rating Number 50}$ Sample Calculation of Player Rating Level Continuing with the above example: Once Player A's new Player Rating Number 50 has been calculated, Player A's new Rating Level 70a, 70b or 70c can be determined. That is, it can then be determined whether Player A's player's rating level 70 is to be raised, lowered or remain the same.

In the preferred embodiment of the invention, each player rating level 70 is designated as an integer (e.g., Level 3, Level 4, Level 5, Level 6, and so on). As discussed above, for a player's rating level 70 to be changed following a match, the player's new rating number 50 preferably must be at least 0.75 higher, or at least 0.75 lower, than that player's prematch rating level 70

Thus, in the example illustrated in the above tables, if Player A's rating level prior to his last match had been, say, Level 11, then his rating level would remain unchanged following his most recent match (as his new rating number is 11.44).

Sample Calculation of Player Rating Reliability Coefficient

As discussed above, the numerical value of the "Match Result Reliability Factor" 40 for a given match depends on (1) the Player Rating Reliability Coefficient 41 for the player's opponent during the match, (2) the Match Format Reliability Coefficient 42 for the match, and (3) the Match Frequency Reliability Coefficient 43 for the match. The preferred manner of calculating the Match Format Reliability Coefficient 42 and the Match Frequency Reliability Coefficient 43 have been previously described.

The preferred method of calculating a Player Rating Reliability Coefficient 41 is now described.

The Player Rating Reliability Coefficient 41 is a number (preferably between 0 and 10) that is calculated on a case-by-case basis for each player in the System. Higher Player Rating Reliability Coefficient values generally indicate that a higher quantity and/or more reliable data for that player is on record in the System; and, conversely, lower values indicate that a lower quantity and/or less reliable data for that player is on record in the System.

In the preferred embodiment of the invention, the Player Rating Reliability Coefficient 41 for a given player has a value equivalent to the numerical sum of all of the Match Result Reliability Factors 40 (for each of the respective matches) that have been used in calculating that player's Player Rating Number, divided by 8. Whenever this calculation yields a number that is equal to or greater than 10, a value of 10 is preferably used for that particular player's Player Rating Reliability Coefficient 41.

In the example illustrated in the above tables, match result data sets from ten different matches played by Player A were used to calculate Player A's Player Rating Number 50. Each of those ten matches had its own (albeit not necessarily unique) Match Result Reliability Factor 40. (See Table 5, far right column.) Since the Player Rating Reliability Coefficient 41 for a Player is the numerical sum of all of the Match Result Reliability Factors (for each of the respective matches) that have been used in calculating the player's rating number, divided by eight, the Player Rating Reliability Coefficient 41 for Player A in the above example can therefore be calculated as follows:

Player $A$'s Rating Reliability Coefficient =

$$\frac{[10 + 10 + 5 + 5 + 10 + 10 + 10 + 10 + 7 + 3]}{8} = 10$$

By factoring each respective opponent's Player Rating Reliability Coefficient 41 into the calculation of a player's rating/ranking in the manner described above, it will be understood that more (rating/ranking) weight is given to match results for matches contested against opponents who have a long, verifiable track record in the System; and, conversely, less weight is given to matches that are contested against opponents for whom there is little match data, and, therefore, for whom their own ranking/rating may be somewhat less reliable. Also, by limiting the maximum value Player Rating Reliability Coefficients 41 (to 10), the amount of influence that match results against any one particular opponent is consequently limited.

It will be understood by those skilled in the art that the system, method and computer program product described herein above provide means for determining a tennis player rating based predominantly, if not entirely, on match outcomes between rated players. It will further be understood that the method and system of the present invention also provides a means for readily adjusting or affirming a player's rating immediately after each match.

It will also be understood that, in accordance with the present invention, adjustments to a player's rating level are not based on whether or not a player wins a match (or matches), but on the percentage of games won and lost by each player.

Many modifications and other embodiments of the invention will come to mind to one skilled in the art to which this invention pertains having the benefit of the teachings presented in the foregoing descriptions and the associated drawings.

Modified Embodiments of the Invention

Although there has been shown and described the preferred embodiment of the present invention, it will be readily apparent to those skilled in the art that modifications may be made thereto which do not exceed the scope of the appended claims. For example:

- A modified embodiment of the present invention can be used for ranking and rating teams, as well as individual players.
- Different numerical values can be used for player rating reliability coefficients, match format reliability coefficients and match frequency reliability coefficients than those described herein above.
- Additional and/or different reliability coefficients can be applied to the calculation of Match Result Reliability Factor for various match characteristics that may influence the reliability of match outcomes. Such characteristics may include, for example, where a match is played (home court versus opponent's court; indoors versus outdoors; hard court versus soft court), or the importance of a match (major tournament match versus exhibition match), or whether the subject player won the match or lost the match (thus, potentially giving more ranking value to a player for a 7-6, 7-6 win than for a 7-6, 0-6, 7-6 loss).
- Variations of the present invention can be adapted to calculate rankings and ratings in other sports besides tennis.
- Player identification numbers may be included in the player-specific-information instead of, or in addition to, a player's name.
- The number of matches that are considered in calculating a player rating number, and/or, the time period considered in calculating a player rating number, can be different from those suggested with respect to the preferred embodiment of the invention;
- The tennis player information received by the processing element can originate from any of a number of different sources and can include any of a number of different pieces of information.
- The range and increments of the player rating level scale can be different from the sixteen-increment scale described herein above.
- The GUI 16, which can comprise any of a number of known devices, is responsive to the processing element 18 for displaying the player-specific information.
- After the processing element 18 has received all of the Match Outcome Data, the processing element can save the Match Outcome Data into the electronic archive database 12. Thereafter, the processing element can display the tennis Player information in any of a number of different manners, including displaying the information for an individual tennis player, or a listing of all rated tennis players and their corresponding player rating, or other information.
- The dynamic electronic information can include any of a number of different graphical summaries for a selected player, such as historical match outcomes against selected opponents.

Whereas the aforementioned description provides one technique by which to determine the tennis player ratings, it should be understood that the described technique is merely illustrative of one technique of determining the tennis player ratings. In this regard, determining the tennis player ratings based upon at least a portion of the player-specific information can be accomplished according to any of a number of techniques without departing from the spirit and scope of the present invention.

In various advantageous embodiments, portions of the system and method of the present invention include a computer program product. The computer program product includes a computer-readable storage medium, such as the non-volatile storage medium, and computer-readable program code portions, such as a series of computer instructions, embodied in the computer-readable storage medium. Typically, the computer program is stored and executed by a processing unit or a related memory device, such as the processing element 18 as depicted in FIG. 1.

In this regard, FIGS. 1-4 are block diagrams and flowchart illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions that execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Therefore, it is to be understood that the invention is not to be limited to the specific embodiments disclosed and that modifications and other embodiments are intended to be included within the scope of the appended claims.

We claim:

1. A process for determining a tennis player rating level for a tennis player, comprising the steps of:

storing first match outcome data (14) in an electronic archive database (12),
said first match outcome data (14) comprising a tennis match score of a first tennis match, said first tennis match being between a first player and a first opponent;

storing in said electronic archive database (14) a first player rating number corresponding to said first player;

storing in said electronic archive database (14) a first opponent first rating number corresponding to said first opponent;

communicating (15) said first match outcome data, said first player rating number and said first opponent rating number from said electronic archive database to a processing element (18);

with said processing element, calculating (14) a first match outcome adjustment value for said first player,
wherein said first match outcome adjustment value has a negative value if said first player lost said first tennis match, and said match outcome adjustment value has a positive value if said first player won said first tennis match;

with said processing element, calculating a first Match Result Index Number (37),
wherein said first Match Result Index Number corresponds to the mathematical sum of said first match outcome adjustment value and said first opponent rating number;

with said processing element, determining a numerical value for a first match reliability factor (36),
wherein the numerical value of said first match reliability factor depends on the format of said first match, and depends on the total number of matches for said first opponent that are stored in said electronic archive database, and depends on a total number of matches between said first player and said first opponent that are stored in said electronic archive database;

and, with said processing element, calculating a first player second rating number (49), wherein said step of calculating said first player second rating number comprises multiplying said Match Result Index Number (38) by said first match reliability factor (36), and wherein said first player is assigned by said electronic processing element a first tennis player rating level corresponding to said first player second rating number, wherein the absolute value of the difference between said first player rating level and said first player second rating number is no more than 0.75.

2. The process according to claim 1, further comprising:

storing second match outcome data in said electronic archive database,
said second match outcome data comprising a tennis match score of a second tennis match, said second tennis match being between said first tennis player and a second opponent;

storing in said electronic archive database a second Match Result Index Number, said second Match Result Index Number corresponding to said second tennis match;

storing in said electronic archive database a numerical value for a second match reliability factor, said second match reliability factor corresponding to said second tennis match;

wherein said step of calculating said first player second rating number further comprises multiplying said second Match Result Index Number by said second match reliability factor;

and wherein said step of calculating said first player second rating number further comprises calculating, with said electronic processing element, a weighted average of said first Match Result Index Number and said second Match Result Index Number, and wherein a weight given to said first Match Result Index Number is proportional to said first match reliability factor and a weight given to said second Match Result Index Number is proportional to said second match reliability factor.

3. The process according to claim 2, wherein said step of determining a numerical value for a first match reliability factor comprises:

calculating a first match format reliability factor, calculating a first match opponent reliability factor, and calculating a first match opponent frequency reliability factor;

and said step of determining a numerical value for a first match reliability factor comprises multiplying said first match format reliability factor by said first match opponent reliability factor and by said first match opponent frequency factor.

4. The process according to claim 3, wherein said first match format reliability factor depends on a maximum number of sets to which said first match is limited;

and wherein the numerical value of said format reliability factor is selected, by said processing element, from within a finite first range, said finite first range including a first number and a second number,
wherein said first number is higher than said second number,
and wherein said first number is selected by said processing element when the number of sets to be played in a match is limited to a third number;
and wherein said second number is selected by said processing element when the number of sets to be played in a match is limited to a fourth number,
and wherein said third number if higher than said fourth number.

5. The process according to claim 4, wherein said first match opponent reliability factor depends on the number of matches for said first opponent stored in said electronic archive database,
and wherein the numerical value of said first match reliability factor is selected by said processing element from within a finite second range, said finite second range including a fifth number and a sixth number,
wherein said fifth number is higher than said sixth number;
and wherein said fifth number corresponds to at least a seventh number of matches for said first opponent being stored in said electronic archive database,
and wherein said sixth number corresponds to a total of only one match for said first opponent being stored in said electronic archive database,
and wherein said seventh number is greater than said sixth number.

6. The process according to claim 5, wherein said first match opponent frequency reliability factor depends on the total number of matches between said first player and said opponent that are stored in said electronic archive database;

and wherein the numerical value of said first match opponent frequency reliability factor is selected by said processing element from within a third range, said third range including eighth number and a ninth number, wherein said eighth number is higher than said ninth number;

and wherein said eight number corresponds to a total of one match between said first player and said first opponent being stored in said electronic archive database;

and wherein said ninth number corresponds to a total of a tenth number of matches between said first player and said first opponent being stored in said electronic archive database;

and wherein said tenth number is greater than one.

* * * * *